United States Patent
Alahyari et al.

(10) Patent No.: US 12,338,766 B1
(45) Date of Patent: Jun. 24, 2025

(54) STEAM INJECTED TURBINE ENGINE STEAM GENERATION CONTROL

(71) Applicant: RTX CORPORATION, Farmington, CT (US)

(72) Inventors: Abbas A. Alahyari, Glastonbury, CT (US); Neil J. Terwilliger, Cheshire, CT (US); Milos Ilak, Hoboken, NJ (US); Daniel T. Pollock, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/537,161

(22) Filed: Dec. 12, 2023

(51) Int. Cl.
| | |
|---|---|
| *F02C 3/30* | (2006.01) |
| *F01K 21/04* | (2006.01) |
| *F01K 23/10* | (2006.01) |
| *F02C 6/18* | (2006.01) |
| *F02C 9/00* | (2006.01) |

(52) U.S. Cl.
CPC ............ F02C 3/305 (2013.01); F01K 21/047 (2013.01); F01K 23/101 (2013.01); F02C 6/18 (2013.01); F02C 9/00 (2013.01)

(58) Field of Classification Search
CPC ......... B64D 27/24; B64D 33/04; F01K 21/10; F01K 21/101; F01K 21/047; F01K 23/10; F01K 23/101; F02C 3/30; F02C 3/305; F02C 6/18
See application file for complete search history.

(56) References Cited

U.S. PATENT DOCUMENTS

| | | | |
|---|---|---|---|
| 5,329,758 A | 7/1994 | Urbach et al. | |
| 5,628,183 A * | 5/1997 | Rice | F22B 1/1815 122/7 B |
| 6,405,521 B1 | 6/2002 | Ranasinghe et al. | |
| 6,698,182 B2 | 3/2004 | Sonoda et al. | |
| 9,163,561 B2 | 10/2015 | Anand et al. | |
| 9,964,003 B2 * | 5/2018 | Benz | F02C 3/34 |
| 10,337,403 B2 * | 7/2019 | Nagao | F02C 7/20 |
| 10,961,909 B2 | 3/2021 | Jupudi et al. | |
| 11,085,335 B2 * | 8/2021 | Toyota | F01K 13/02 |
| 11,156,168 B2 * | 10/2021 | Nose | F02C 3/20 |
| 11,753,993 B1 | 9/2023 | Terwilliger et al. | |
| 11,976,580 B2 * | 5/2024 | Klingels | F01K 21/005 |
| 12,018,594 B2 * | 6/2024 | Sibbach | F02C 7/224 |

(Continued)

FOREIGN PATENT DOCUMENTS

DE 4129115 A1 * 3/1993 ............. F01K 23/10

OTHER PUBLICATIONS

Extended European Search Report for European Application No. 24219497.5 mailed Apr. 17, 2025.

*Primary Examiner* — Alain Chau
(74) *Attorney, Agent, or Firm* — Carlson, Gaskey & Olds, P.C.

(57) ABSTRACT

A propulsion system for an aircraft includes at least two steam generation assemblies that each include a condenser where water is extracted from the gas flow and an evaporator where the extracted water is heated to generate a portion of a total steam flow for injection into the core flow path. A monitoring system is configured to gather information indicative of operation of each of the at least two steam generation assemblies. A control system is configured to independently adjust operation of each of the at least two steam generation assemblies.

20 Claims, 4 Drawing Sheets

(56) References Cited

U.S. PATENT DOCUMENTS

| | | | | |
|---|---|---|---|---|
| 2014/0360154 A1* | 12/2014 | Benz | ................... | F02C 3/34 |
| | | | | 60/39.52 |
| 2015/0121892 A1* | 5/2015 | Benz | ................... | F02C 3/34 |
| | | | | 60/645 |
| 2015/0128608 A1* | 5/2015 | Benz | ................... | F02C 3/34 |
| | | | | 60/39.52 |
| 2016/0186659 A1* | 6/2016 | Nagao | ................. | F02C 7/20 |
| | | | | 60/39.182 |
| 2019/0178112 A1* | 6/2019 | Toyota | ................ | F02C 6/00 |
| 2020/0032676 A1* | 1/2020 | Nose | .................... | F23R 3/36 |
| 2021/0207500 A1* | 7/2021 | Klingels | ............... | F02C 3/305 |
| 2023/0150678 A1* | 5/2023 | Klingels | .............. | B64D 33/04 |
| | | | | 244/55 |
| 2023/0258126 A1 | 8/2023 | Terwilliger et al. | | |
| 2023/0286661 A1* | 9/2023 | Klingels | ................. | F02C 7/16 |
| 2024/0011417 A1* | 1/2024 | Sibbach | ............... | F01D 21/12 |

\* cited by examiner

STEAM INJECTED TURBINE ENGINE STEAM GENERATION CONTROL

TECHNICAL FIELD

The present disclosure relates generally to an aircraft propulsion system with a system for monitoring and controlling water extraction and steam generation.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere.

Turbine engine manufacturers continue to seek further improvements to engine performance including improvements to reduce environmental impact while improving propulsive efficiencies.

SUMMARY

A propulsion system for an aircraft according to an exemplary embodiment of this disclosure includes, among other possible things, a core engine that includes a core flow path where air is compressed in a compressor section, communicated to a combustor section, mixed with fuel, and ignited to generate a gas flow that is expanded through a turbine section. At least two steam generation assemblies each include a condenser where water is extracted from the gas flow and an evaporator where the extracted water is heated to generate a portion of a total steam flow for injection into the core flow path. A monitoring system is configured to gather information indicative of operation of each of the at least two steam generation assemblies. A control system is configured to independently adjust operation of each of the at least two steam generation assemblies. A controller is programmed to receive information gathered by the monitoring system and operate the control system to adjust operation independently and individually of each of the at least two steam generation assemblies to control the total steam flow.

In a further embodiment of the foregoing propulsion system, the controller is programmed to operate the control system to generate the total steam flow from the at least two steam generation assemblies to maintain a predefined quantity of the total steam flow for a current engine operating condition.

In a further embodiment of any of the foregoing propulsion systems, a capacity for generating a portion of the total steam flow is different for each of the at least two steam generation assemblies and the controller is programmed to operate the control system to individually operate each of the at least two steam generation assemblies to maintain generation of the predefined quantity of the total steam flow.

In a further embodiment of any of the foregoing propulsion systems, the capacity for generating a portion of the total steam flow by each of the at least two steam generating assemblies varies during an engine operating cycle and the controller is programmed to adjust continually and individually each of the at least two steam generating assemblies to maintain the predefined quantity of the total steam flow.

In a further embodiment of any of the foregoing propulsion systems, the capacity of each of the at least two steam generation assemblies vary based on a position relative to the core engine.

In a further embodiment of any of the foregoing propulsion systems, the controller includes a predictive model of each of the at least two steam generation assemblies that estimates operation based on the gathered information and the controller is programmed to operate the control system based on estimated operation from the predictive model.

In a further embodiment of any of the foregoing propulsion systems, the controller is further programmed to shut down operation of at least one of the steam generation assemblies based on information from the monitoring system that is indicative of a deviation from a predefined operating condition outside of predefined limits.

In a further embodiment of any of the foregoing propulsion systems, the monitoring system includes at least one sensor that provides information relating to the extraction and heating of water within at least one of the condenser and the evaporator for each of the at least two steam generation systems.

In a further embodiment of any of the foregoing propulsion systems, the monitoring system includes at least one sensor that provides information relating to the gas flow through each of the evaporator and condenser for each of the at least two steam generation systems.

In a further embodiment of any of the foregoing propulsion systems, the monitoring system that includes at least one sensor that provides information relating to a cooling flow through the condenser of each of the at least two steam generation systems.

In a further embodiment of any of the foregoing propulsion systems, the control system includes at least one actuator that provides control of a flow of water that is extracted by the condenser of each of the at least two steam generation systems.

In a further embodiment of any of the foregoing propulsion systems, the control system includes at least one actuator for controlling the gas flow through at least one of the evaporator and the condenser for each of the at least two steam generation systems.

In a further embodiment of any of the foregoing propulsion systems, the control system includes at least one actuator for controlling a cooling flow through the condenser of each of the at least two steam generation systems.

In a further embodiment of any of the foregoing propulsion systems, the control system includes at least one actuator for each of the at least two steam generation systems for controlling a cooling flow through the condenser.

In a further embodiment of any of the foregoing, the propulsion system further includes at least one passive actuator that operates to control at least one operating parameter of a corresponding one of the at least two steam generation assemblies independent of the controller.

In a further embodiment of any of the foregoing, the propulsion system further includes a steam turbine where shaft power is generated from expansion of the portion of the total steam flow and the controller is further programmed to operate the steam turbine to regulate at least a portion of the total steam flow.

A method of operating an aircraft propulsion system according to another exemplary embodiment of this disclosure includes, among other possible things, generating a gas flow with a core engine that includes a core flow path, generating a total steam flow for injection into the core flow path with at least two steam generation assemblies that each include a condenser where water is extracted from the gas flow and an evaporator where the extracted water is heated to generate a portion of the total steam flow, gathering information indicative of operation of the at least two steam generation assemblies with a monitoring system, and independently adjust operation of each of the at least two steam generation assemblies with a controller operating at least one actuator to maintain a predefined quantity of the total steam flow.

In a further embodiment of the foregoing, the method further includes continually and individually adjusting each of the at least two steam generating assemblies during operation to maintain the predefined quantity of the total steam flow.

In a further embodiment of any of the foregoing, the method includes estimating operation of each of the at least two steam generation assemblies with a predictive model and adjusting operation to maintain the predefined quantity of total steam flow based on estimates from the predictive model.

In a further embodiment of any of the foregoing, the method further includes monitoring at least one parameter that is indicative of the extraction and heating of water within at least one of the condenser and the evaporator with at least one sensor and adjusting operation based on the at least one monitored parameter.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
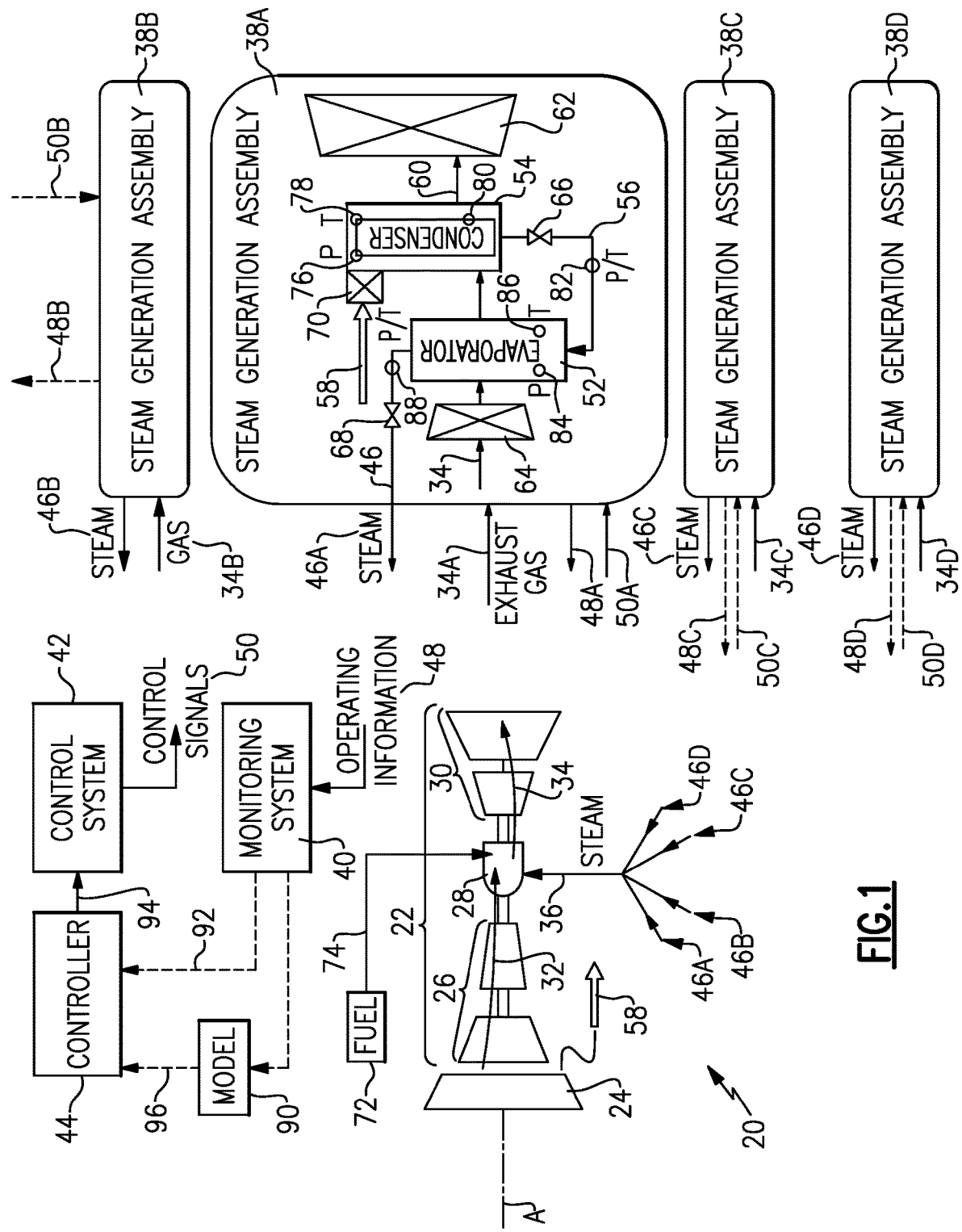
FIG. 1 is a schematic view of an example propulsion system embodiment including a plurality of steam generation assemblies.

FIG. 1 schematically illustrates an example aircraft propulsion system 20 that includes a plurality of steam generation assemblies 38A-D that provide steam for injection into a core flow path C of a core engine. Steam generation from each of the steam generation assemblies 38A-D is individually adjustable and controllable to accommodate differences in steam generation and provide a predefined quantity of total steam flow 36.

The propulsion system 20 includes core engine 22 with a core airflow path C through a fan 24, a compressor section 26, a combustor 28 and a turbine section 30. The fan 22 drives inlet air into the compressor section 26. In the compressor section 26, a core flow 32 is compressed and communicated to the combustor 28 where it is mixed with fuel 74 and ignited to generate a high energy exhaust gas flow 34 that expands through the turbine section 30. In the turbine section 30 energy is extracted and utilized to drive the fan 24 and the compressor section 26. A bypass flow 58 flow through the fan 24 may bypass the core engine 22.

Although a core engine 22 architecture is schematically shown and disclosed by way of example, other engine architectures would benefit from this disclosure and are within the contemplation and scope of this disclosure.

A fuel system 72 provides the fuel flow 74 to the combustor 28. In one disclosed example, the fuel 74 is liquid hydrogen ($LH_2$). Although hydrogen is disclosed by way of example, other non-carbon-based fuels could be utilized and are within the contemplation of this disclosure. Moreover, the disclosed features may also be beneficial in an engine configured to operate with traditional carbon fuels, biofuels, and sustainable aviation fuels.

A plurality of steam generation assemblies 38A-D are schematically shown and each receive a portion 34A-D of the exhaust gas flow 34 and provide for the generation of a portion 46A-D of a total steam flow 36. The total steam flow 36 is injected into the core flow path C. In the disclosed example the total steam flow 36 is injected into the combustor 28. However, the steam flow 36 may be injected at other locations within the core flow path C and remain within the contemplation and scope of this disclosure.

Each of the plurality of steam generation assemblies 38A-D is supported by support components such as conduits, reservoirs, valving, and any other components needed for the transport and communication of water and steam. Moreover, each of the steam generation assemblies 38A-D may include individual reservoirs and pumps to communicate extracted water to the evaporator 52. Alternatively, reservoirs, pumps, and other components for communicating water and steam may be shared and operate to service one or more of the steam generation assemblies 38A-D. For example, a reservoir may receive water from more than one condenser 54 and communicate water to more than evaporator 52 from different steam generation assemblies 38A-D.

The propulsion system 20 has an increased power output from the injected steam due 36 by increasing mass flow through the turbine section 30 without a corresponding increase in work required from the compressor section 26. An example engine operation cycle may include up to (or more than) 35% steam-air-ratios (SAR). Moreover, the amount of steam available may be assisted by increased moisture content in the exhaust gas flow from burning hydrogen as the fuel.

The disclosed propulsion system includes a plurality of steam generating assemblies 38A-D. Each of the steam generating assemblies 38A-D include common features as are shown schematically for the individual steam generation assembly 38A. Each of the steam generation assemblies 38A-D include a condenser 54 where water 56 is extracted from the gas flow 34 and an evaporator 52 where the extracted water is heated to generate a portion 46A-D of the total steam flow 36 for injection into the core flow path C. The multiple steam generating assemblies 38A-D are provided with common features and functionality as exemplified by the details shown schematically for the steam generation assembly 38A. Moreover, although four steam generation assemblies 38A-D are shown by way of example, any number of steam generation assemblies greater than or equal to two may be utilized and remain within the scope and contemplation of this disclosure.

The multiple steam generation assemblies 38A-D operate in parallel and are arranged relative to the core engine 22 to accommodate space limitations and communication of exhaust gas and cooling flows. During operation, each of the individual steam generation assemblies 38A-D may or may not produce the same amount of water 56 and thereby steam 46 at every engine operating condition. Differences in water extraction and steam generation may occur between the steam generation assemblies 38A-D for various reasons such as uneven water distribution, gravitational effects, mechanical defects, or malfunction. The example propulsion system 20 includes a monitoring system 40, a control system 42 and a controller 44 that provides for the independent and individual control and adjustment of each steam generation assembly 38A-D to provide a predefined quantity and quality of the total steam flow 36. Moreover, the disclosed propulsion system provides for the amount of steam generated by each of the assemblies 38A-D to be tailored to current engine operating conditions based on individual assembly performance.

The disclosed propulsion system 20 adjusts each of the steam generation assemblies 38A-D to accommodate imbalances in operation and to recognize and react to deviations from expected operation. Balance and control of the steam generation assemblies 38A-D is accomplished, in one example disclosed embodiment, with a monitoring system 40, control system 42 and a controller 44. The monitoring system 40 is configured to gather information indicative of operation of each of the individual steam generation assemblies 38A-D. The control system is configured to independently adjust operation of each of the steam generation assemblies 38A-D based on instructions from a controller 44. The controller 44 is programmed to receive information from the monitoring system 40 and to operate the control system 42 to adjust operation independently and individually of each of the steam generation assemblies 38A-D to provide and control the quantity and quality of the total steam flow 36.

The example monitoring system 40 includes at least one sensor that is associated with each of the steam generation assemblies 38A-D to provide information that is indicative of operation of that particular steam generation assembly 38A-D. Operating parameters that are monitored to provide an indication of steam generation assembly 38A-D production can include pressure, temperature, pressure gradient, water flow, flow volume of water and/or steam, and/or any combination of such parameters. Moreover, information indicative of operation may include separate monitoring of water, steam, exhaust gas and cooling flows for each of the assemblies 38A-D. The monitoring system 40 receives operating information 48 from the sensors for each of the steam generation assemblies 38A-D.

In one example disclosed embodiment, a condenser pressure sensor 76 and condenser temperature sensor 78 are arranged to obtain information indicative of conditions within the condenser 54. A flow sensor 80 is further provided to provide information indictive of a quantity of water extracted from the exhaust gas flow 34. Additionally, information of the flow of water between the condenser 54 and the evaporator 52 as indicated at 82.

An evaporator pressure sensor 84 and an evaporator temperature sensor 86 provides information indicative of evaporator operation. The pressure sensor 84 and temperature sensor 86 may be utilized to provide information on the generation of steam, or on the condition of the exhaust gas flow communicated through the evaporator 52. Additionally, a sensor 88 may be provided to obtain pressure and temperature information of steam flow 46A exhausted from the evaporator 52.

Although a single steam generation assembly 38A is shown in detail, all of the steam generation assemblies 38A-D would include the same or similar sensors to provide information on common parameters to the monitoring system. Moreover, each of the steam generation assemblies 38A-D may include sensors to measure the same parameter in the same location or have different sensors that measure different parameters at different locations to tailor the operating information 48 to specific propulsion system architectures and configurations.

Additionally, information indictive of operation of the core engine may be provided as part of the operating information 48 and utilized to understand performance of the steam generating assemblies 38A-D.

The control system 42 is shown schematically and may include various different actuators and combination of actuators that can be activated alone or in combination to alter and adjust operation of each of the steam generation assemblies 38A-D. In one example embodiment, the example control system 42 includes at least one control device that is operable in response to instructions 94 from the controller 44.

The actuators may provide for adjustment to the gas and cooling flows through each evaporator 52 and condenser 54 and/or control water and steam flow. The example control system 42 provides outputs individual control signals 50A-D tailored to the adjustments target to the needs of each of the steam generation assemblies 38A-D.

In one example disclosed embodiment, a water control valve 66 provides control of extracted water 56 to the evaporator 52. A steam valve 68 is provided to control steam flow 46 exhausted from the evaporator 52. Control of water flow and steam flow enables tailoring of flows between the assemblies 38A-D to balance steam output that is combined to generate the total steam flow 36.

In one example disclosed embodiment, an inlet nozzle 64 is provided to control the exhaust gas flow 34 communicated through the evaporator 52. The example inlet nozzle 64 is actuatable to proportion the amount of exhaust gas flow 34 communicated to the evaporator 52. Control of the exhaust gas flow 34 provides control of the amount of thermal energy available for the generation of steam.

The amount of the cooling bypass flow 58 to the condenser 54 may be controlled with a flow actuator 70. Outlet flow 60 from the condenser 54 may be controlled by adjustments to an exhaust nozzle 62. Although the inlet nozzle 64, flow actuator 70 and outlet nozzle 62 are disclosed by way of example, other control devices could be utilized to control pressure, temperature, water extraction and steam generation and are within the contemplation and scope of this disclosure.

Although the control system 42 is shown as providing individual control signals 50A-D to each of the steam generation assemblies 38A-D, the actuators may be operated passively. In one disclosed example, one of the control devices including the valves 66, 68, actuator 70 and nozzles 62 and 64 operate independent of the control system 42 based on conditions within each individual assembly 38A-D.

Additionally, the control system 42 may provide the instructions 50A-D to shut down operation of one of the steam generation assemblies 38A-D. Shutting down of one, several or a group of steam generation assemblies 38A-D may be implemented based on a prescribed operating cycle and/or in response to information that indicates a failure or malfunction. Moreover, the control system 42 may shut down one or more of the steam generation assemblies based on a deviation from a predefined operating condition outside of predefined limits. Accordingly, adjustments to the steam generation assemblies 38A-D may include shutting down operation of an individual one of the steam generation assemblies 38A-D.

Figure 2:
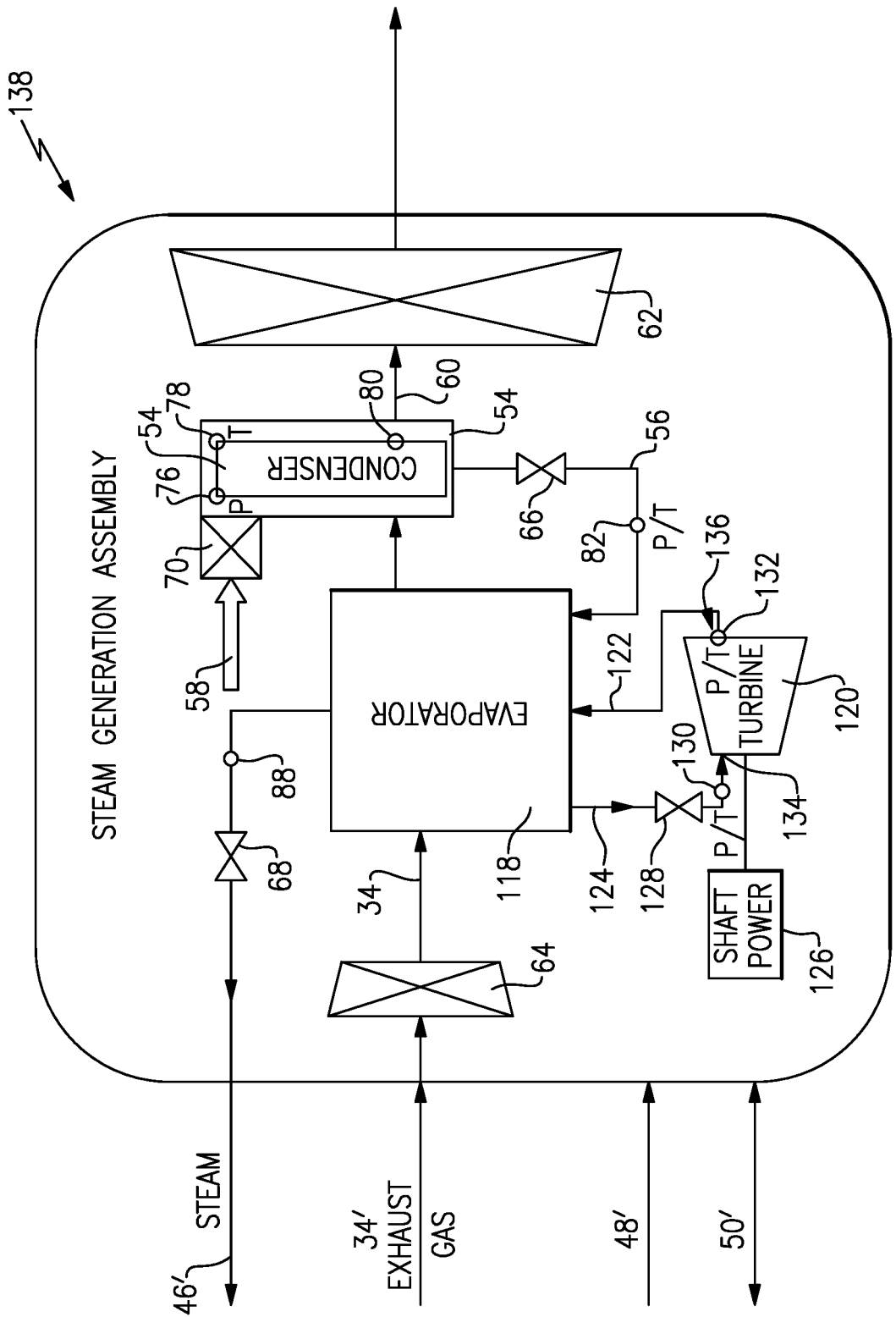
FIG. 2 is a schematic view of another example steam generation assembly embodiment.

Referring to FIG. 2, with continued reference to FIG. 1, another example steam generation assembly 138 is schematically shown and includes a steam turbine 120 that is configured to receive at least a portion of steam 124 output from evaporator 118. The steam 124 expands through the steam turbine 120 to generate shaft power 126. The shaft power 126 may be utilized to drive engine and/or aircraft components and/or accessory devices. Expanded steam is communicated as an exhausted steam flow 122 back to the evaporator 118 for additional heating. In the disclosed example, exhausted steam flow 122 is reheated within the evaporator 118. However, a secondary evaporator and/or superheater may be provided to further add thermal energy to the exhausted steam flow 122.

Steam flow 124 communicated to the steam turbine 120 and the exhausted steam flow 124 is maintained as steam and not allowed to re-condense by control of the steam turbine 120. Control of operation of the steam turbine 120 may be provided by a control valve 128. Control of operation of the steam turbine 120 may also be provided though adjusting a load or varying an area ratio corresponding with turbine operation. A pressure and temperature may be measured by a sensor 130 at an inlet 134 of the steam turbine 120. A pressure and temperature may also be monitored and measured by a sensor 132 at an outlet 136 of the steam turbine 120. Information provided by the sensors 130 and 132 is communicated to the controller 44 and provides a basis for adjusting operation of the steam generation assembly 138. The steam turbine 120 provides an additional component to enable control of operation of the steam generation assembly 138. Accordingly, the controller 44 is further programmed to operate the control system 42 to operate the steam turbine 120 to regulate at least a portion of the total steam flow 36.

Although the steam turbine 120 is illustrated as provided with one steam generation assembly 138, the steam turbine 120 may receive steam flows from several steam generation assemblies with individual or grouped controls to facilitate adjustment of steam generation to engine operation.

Figure 3:
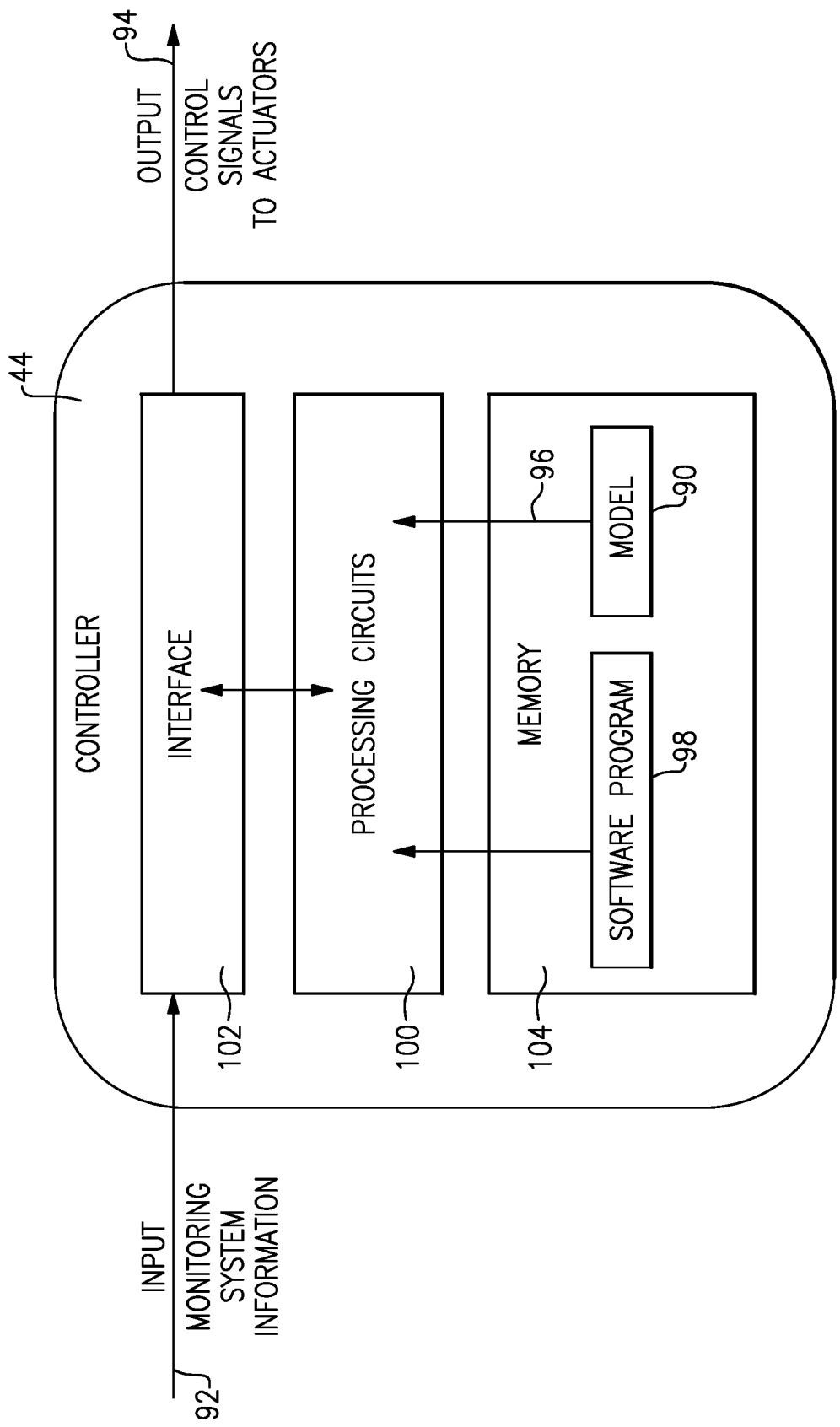
FIG. 3 is a schematic illustration of an example controller for controlling steam generation by steam generation assemblies.

Referring to FIG. 3, with continued reference to FIG. 1, the example controller 44 is a device and system for performing necessary computing or calculation operations for operation of the control system 42 and propulsion system 20. The controller 44 may be specially constructed for operation of the control system 42, or it may comprise at least a general-purpose computer selectively activated or reconfigured by software programs 98 stored in a memory device 104 and executed by processing circuits 100. The controller 44 may further be part of full authority digital engine control (FADEC) or an electronic engine controller (EEC).

The example processing circuits 100 may include one or more microprocessors, microcontrollers, application specific integrated circuits (ASICs), or the like. The memory device 104 may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory device 104 may incorporate electronic, magnetic, optical, and/or other types of storage media. The memory 104 stores instructions which, when executed by the processing circuits 100, cause the processing circuit 100 to implement the various operations and/or generate instructions for operating the control system 42.

The example controller 44 further includes a communication interface 102 that provides for the receiving in inputs 92 from the monitoring system 40 and from the predictive model 90. Moreover, the communication interface 102 is further configured to communicate instructions as an output 94 provided to the control system 42. The output 94 may include various signals in forms required for operating control devices such as the example valves, 66, 68, actuator 70, nozzles 64, 62 and any other engine actuator utilized to control and adjust operation.

The example controller 44 may include information output 96 from the predictive model 90 of each of the steam generation assemblies 38A-D that estimates operation based on the gathered input information 92. The controller 44 is further programmed to operate the control system 42 to adjust operation of each of the steam generation assemblies 38A-D. The predictive model 90 may be operated based on learned operating behavior of each of the steam generation assemblies 38A-D as accumulated during propulsion system operation. Moreover, the predictive model 90 may estimate the values of operating parameters of each of the steam generation assemblies 38A-D based on the input information 92 and provided information utilized to generate the output 94 used to alter and tailor steam generation within each of the assemblies 38A-D.

Figure 4:
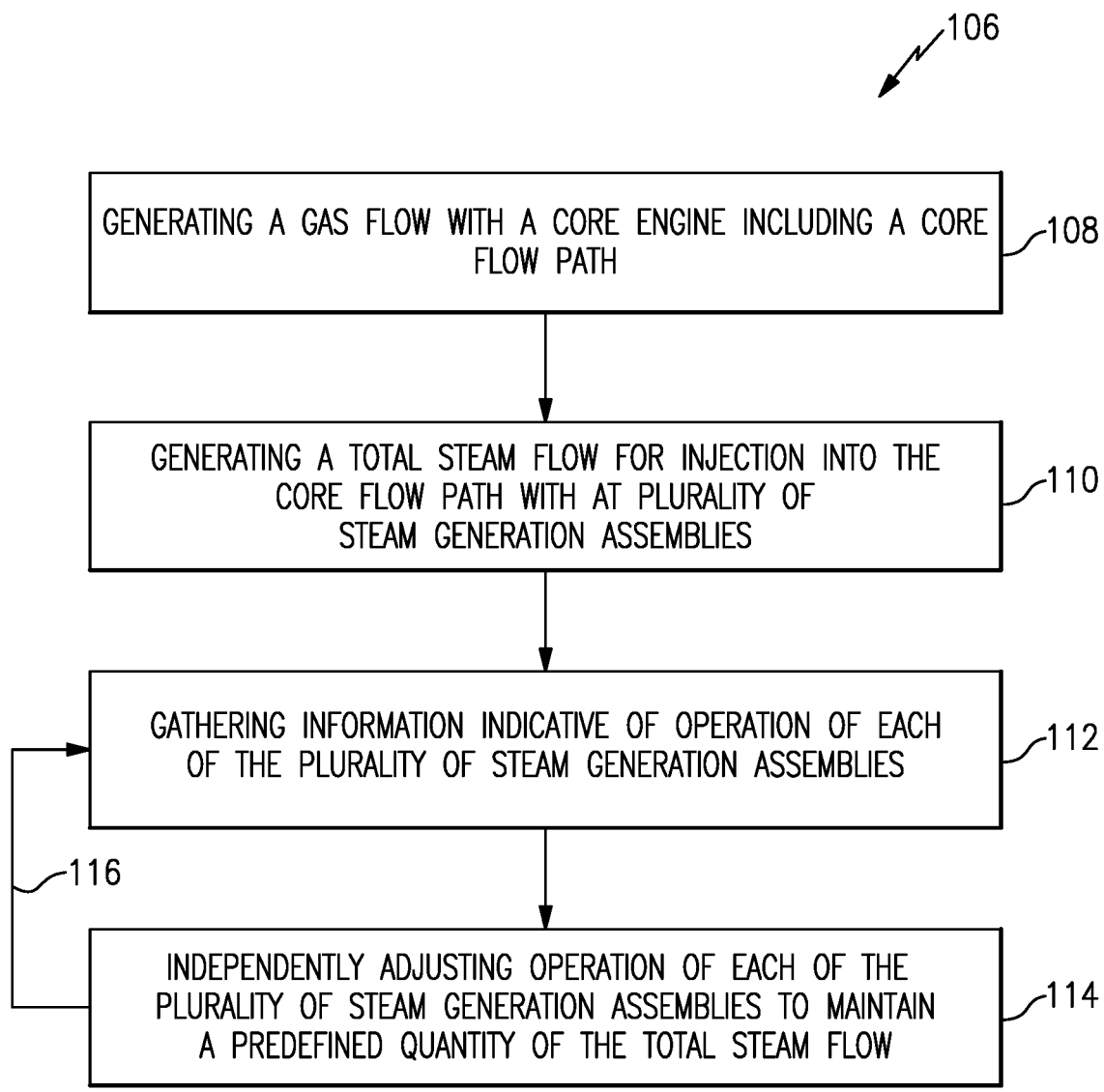
FIG. 4 is a flow diagram illustrating an example method of operating an aircraft propulsion system to accommodate differences in steam generation among a plurality of steam generation assemblies.

Referring to FIG. 4, with continued reference to FIGS. 1 and 3, example operating steps for a disclosed method of operating the propulsion system 20 are schematically shown at 106 and include generating the gas flow 34 with the core engine 22 along the core flow path C as indicated at 108.

A portion 34A-D of the gas flow 34 is communicated to each of the plurality of steam generating assemblies 38A-D. In each of the steam generating assemblies 38A-D, water is extracted by the condenser 54 and heated by thermal energy from respective portions of the exhaust gas flows 34A-D in the evaporator 52 to generate individual steam flows 46A-D. The steam flows 46A-D are combined as the total steam flow 36 as indicated at 110.

During operation to generate the steam flows 46A-D, the monitoring system 40 gathers operating information 48 indictive of operation of each of the individual steam generation assemblies 38A-D. The operating information 48 may include temperature, pressure, flow and/or combinations of each operating parameter that is indicative of how each of the steam generation assemblies 38A-D is operating.

Operation of each of the steam generation assemblies 38A-D is communicated to the controller 44. The controller 44 uses the communicated information 92 to determine if any adjustments may be required to each of the steam generation assemblies 38A-D. Adjustments maybe required to increase, reduce or turnoff steam generation based on overall propulsion system requirements. In one example embodiment, the steam generation assemblies 38A-D are adjusted to provide a predefined amount of the total steam 36 generated for injection into the core engine 22. In another example embodiment, the controller 44 bases any adjustments, at least partially, on determinations made by the predictive model 90. In another example embodiment, a capacity for generating the portion 46A-D of the total steam flow 36 by each of the steam generating assemblies 38A-D may vary during an engine operation cycle and adjustments made based on the changes in capacity. Moreover, the location of the steam generation assembly 38A-D relative to the core engine 22 may constrain steam generation and provides a criterial for altering and adjusting operation. Other criteria may be utilized for adjusting each of the steam generation assemblies 38A-D and are within the contemplation of this disclosure.

The example controller 44 generates instructions and provides an output 94 to the control system 42. The output 94 includes instructions provided to control devices such as the valves 66, 68, actuator 70 and nozzles 62, 64 that independently adjust operation of each of the steam generation assemblies 38A-D as is indicated at 114.

Adjustments may be made to balance steam generation across all of the steam generation assemblies. Such adjustments may include increasing steam production in some steam generation assemblies and reducing steam production on other assemblies 38A-D. Additionally, adjustments may be made to change steam generation based on current operating conditions in response to the gathered operating information 48. Moreover, adjustment may be made based on an engine operating cycle through take-off, cruise, and landing operation. Although examples are provided by way of example, any operating criteria could be utilized to provide the basis for adjustment and control of each of the steam generation assemblies 38A-D.

Adjustments may be made continually as the gathered information is updated and operation changes. Accordingly, the steps of gathering information 112 and independent adjusting operation 114 are repeated as indicated at 116. Repeating the steps 112 and 114 may be made continuously, at discrete intervals, and/or based on other criteria that accommodates and accounts for operation of the propulsion system 20.

Accordingly, the example steam generation assemblies 38A-D are controlled to individually adjust steam generation to tailor operation in view of performance differences.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
a core engine including a core flow path where air is compressed in a compressor section, communicated to a combustor section, mixed with fuel, and ignited to generate a gas flow that is expanded through a turbine section;
at least two steam generation assemblies that each include a condenser where water is extracted from the gas flow and an evaporator where the extracted water is heated to generate a portion of a total steam flow for injection into the core flow path, wherein a capacity for generating a portion of the total steam flow is different for each of the at least two steam generation assemblies;
a monitoring system configured to gather information indicative of operation of each of the at least two steam generation assemblies;
a control system configured to independently adjust operation of each of the at least two steam generation assemblies; and
a controller programmed to receive information gathered by the monitoring system and operate the control system to adjust operation independently and individually of each of the at least two steam generation assemblies to control the total steam flow to maintain generation of a predefined quantity of the total steam flow, the controller is further programmed to operate the control system to generate the total steam flow from the at least two steam generation assemblies to maintain a predefined quantity of the total steam flow for a current engine operating condition, wherein the capacity for generating a portion of the total steam flow by each of the at least two steam generating assemblies varies during an engine operating cycle and the controller is further programmed to adjust continually and individually each of the at least two steam generating assemblies to maintain the predefined quantity of the total steam flow, and to shut down operation of at least one of the steam generation assemblies based on information from the monitoring system indicative of a deviation from a predefined operating condition outside of predefined limits.

2. The propulsion system as recited in claim 1, wherein the capacity of each of the at least two steam generation assemblies vary based on a position relative to the core engine.

3. The propulsion system as recited in claim 1, wherein the controller includes a predictive model of each of the at least two steam generation assemblies that estimates operation based on the gathered information and the controller is programmed to operate the control system based on estimated operation from the predictive model.

4. The propulsion system as recited in claim 1, wherein the monitoring system includes at least one sensor that provides information relating to the extraction and heating of water within at least one of the condenser and the evaporator for each of the at least two steam generation systems.

5. The propulsion system as recited in claim 1, wherein the monitoring system includes at least one sensor that provides information relating to the gas flow through each of the evaporator and condenser for each of the at least two steam generation systems.

6. The propulsion system as recited in claim 1, wherein the monitoring system that includes at least one sensor that provides information relating to a cooling flow through the condenser of each of the at least two steam generation systems.

7. The propulsion system as recited in claim 1, wherein the control system comprises at least one actuator that provides control of a flow of water extracted by the condenser of each of the at least two steam generation systems.

8. The propulsion system as recited in claim 1, wherein the control system comprises at least one actuator for controlling the gas flow through at least one of the evaporator and the condenser for each of the at least two steam generation systems.

9. The propulsion system as recited in claim 1, wherein the control system comprises at least one actuator for controlling a cooling flow through the condenser of each of the at least two steam generation systems.

10. The propulsion system as recited in claim 9, wherein the control system comprises at least one actuator for each of the at least two steam generation systems for controlling a cooling flow through the condenser.

11. The propulsion system as recited in claim 1, further comprising at least one passive actuator that operates to control at least one operating parameter of a corresponding one of the at least two steam generation assemblies independent of the controller.

12. The propulsion system as recited in claim 1, further comprising a steam turbine where shaft power is generated from expansion of the portion of the total steam flow and the controller is further programmed to operate the steam turbine to regulate at least a portion of the total steam flow.

13. A method of operating an aircraft propulsion system comprising:
generating a gas flow with a core engine including a core flow path;
generating a total steam flow for injection into the core flow path with at least two steam generation assemblies that each include a condenser where water is extracted from the gas flow and an evaporator where the extracted water is heated to generate a portion of the total steam flow;
gathering information indicative of operation of the at least two steam generation assemblies with a monitoring system;
independently adjust operation of each of the at least two steam generation assemblies with a controller operating at least one actuator to maintain a predefined quantity of the total steam flow, further comprising continually and individually adjusting each of the at least two steam generating assemblies during operation to maintain the predefined quantity of the total steam flow; and
estimating operation of each of the at least two steam generation assemblies with a predictive model and adjusting operation to maintain the predefined quantity of total steam flow based on estimates from the predictive model.

14. The method as recited in claim 13, further comprising monitoring at least one parameter indicative of the extraction and heating of water within at least one of the condenser and the evaporator with at least one sensor and adjusting operation based on the at least one monitored parameter.

15. A propulsion system for an aircraft comprising:
a core engine including a core flow path where air is compressed in a compressor section, communicated to a combustor section, mixed with fuel, and ignited to generate a gas flow that is expanded through a turbine section;
at least two steam generation assemblies that each include a condenser where water is extracted from the gas flow and an evaporator where the extracted water is heated to generate a portion of a total steam flow for injection into the core flow path;
a monitoring system configured to gather information indicative of operation of each of the at least two steam generation assemblies;
a control system configured to independently adjust operation of each of the at least two steam generation assemblies; and
a controller programmed to receive information gathered by the monitoring system and operate the control system to adjust operation independently and individually of each of the at least two steam generation assemblies to control the total steam flow, wherein the controller further comprises a predictive model of each of the at least two steam generation assemblies that estimates operation based on the gathered information and the controller is further programmed to operate the control system based on the predictive model to generate the total steam flow from the at least two steam generation assemblies to maintain a predefined quantity of the total steam flow for a current engine operating condition.

16. The propulsion system as recited in claim 15, wherein a capacity for generating a portion of the total steam flow is different for each of the at least two steam generation assemblies and the controller is programmed to operate the control system to individually operate each of the at least two steam generation assemblies to maintain generation of the predefined quantity of the total steam flow.

17. The propulsion system as recited in claim 15, wherein the capacity for generating a portion of the total steam flow by each of the at least two steam generating assemblies varies during an engine operating cycle and the controller is programmed to adjust continually and individually each of the at least two steam generating assemblies to maintain the predefined quantity of the total steam flow.

18. The propulsion system as recited in claim 15, wherein the capacity of each of the at least two steam generation assemblies vary based on a position relative to the core engine.

19. The propulsion system as recited in claim 15, wherein the monitoring system includes at least one sensor that provides information relating to the extraction and heating of water within at least one of the condenser and the evaporator for each of the at least two steam generation systems.

20. The propulsion system as recited in claim 15, further comprising at least one passive actuator that operates to control at least one operating parameter of a corresponding one of the at least two steam generation assemblies independent of the controller.

* * * * *